United States Patent
Wakiyama et al.

(10) Patent No.: US 10,245,892 B2
(45) Date of Patent: Apr. 2, 2019

(54) TIRE

(71) Applicant: BRIDGESTONE CORPORATION, Tokyo (JP)

(72) Inventors: Tadashi Wakiyama, Tokyo (JP); Shoji Hayashi, Tokyo (JP); Ietomo Matsunaga, Tokyo (JP); Masaki Wada, Tokyo (JP); Masafumi Koide, Tokyo (JP); Tatsuya Nakai, Tokyo (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 179 days.

(21) Appl. No.: 15/026,639

(22) PCT Filed: Jun. 30, 2014

(86) PCT No.: PCT/JP2014/067424
§ 371 (c)(1),
(2) Date: Apr. 1, 2016

(87) PCT Pub. No.: WO2015/052966
PCT Pub. Date: Apr. 16, 2015

(65) Prior Publication Data
US 2016/0236519 A1 Aug. 18, 2016

(30) Foreign Application Priority Data
Oct. 9, 2013 (JP) .................................. 2013-211745

(51) Int. Cl.
*B60C 11/03* (2006.01)
*B60C 11/11* (2006.01)
*B60C 11/13* (2006.01)

(52) U.S. Cl.
CPC ...... *B60C 11/0332* (2013.01); *B60C 11/0302* (2013.01); *B60C 11/0304* (2013.01); *B60C 11/0306* (2013.01); *B60C 11/1376* (2013.01); *B60C 2011/0341* (2013.01); *B60C 2011/0386* (2013.01)

(58) Field of Classification Search
CPC ............ B60C 11/1376; B60C 11/1384; B60C 11/1392
See application file for complete search history.

(56) References Cited

U.S. PATENT DOCUMENTS 4,722,378 A * 2/1988 Carolla ............... B60C 11/0302
152/209.15
4,884,607 A * 12/1989 Mori .................... B60C 11/0302
152/209.18

(Continued)

FOREIGN PATENT DOCUMENTS

JP 2002-29216 A 1/2002
JP 2005-263180 A 9/2005

(Continued)

OTHER PUBLICATIONS

Communication dated Sep. 27, 2016, from the European Patent Office in counterpart European Application No. 14852374.9.

(Continued)

*Primary Examiner* — Kendra Ly
(74) *Attorney, Agent, or Firm* — Sughrue Mion, PLLC

(57) ABSTRACT

An object is to improve noise performance of a tire while enhancing movement performance thereof. At least one of the land portions (20) includes an outer wall surface (30) positioned on a vehicle outer side, an inner wall surface (31) positioned on a vehicle inner side, a tread surface (32) on an outer side in a tire radial direction, an outer edge (33) of the tread surface (32) in contact with the outer wall surface (30), and an inner edge (34) of the tread surface (32) in contact with the inner wall surface (31). The tread surface (32) is formed in a convex shape which is smoothly curved between the outer edge (33) and the inner edge (34) and which has a top portion (43) most protruded outward in the tire radial direction, in a cross section of the land portion (20) in a tire width direction. A relationship of Do <Di is satisfied when (Continued)

a distance between the top portion (43) and the outer edge (33) in the tire radial direction is denoted as Do, and a distance between the top portion (43) and the inner edge(34) in the tire radial direction is denoted as Di. The top portion (43) is positioned closer to the inner edge (34) side from a center (P) of the land portion (20) in the tire width direction.

3 Claims, 1 Drawing Sheet

(56) References Cited

U.S. PATENT DOCUMENTS

2005/0241738 A1* 11/2005 Shida ................ B60C 11/0083
152/209.15
2011/0061780 A1 3/2011 Mita

FOREIGN PATENT DOCUMENTS

| JP | 2006176055 A | 7/2006 |
| JP | 2011-57141 A | 3/2011 |
| JP | 2012-17008 A | 1/2012 |
| JP | 2012-116410 A | 6/2012 |

OTHER PUBLICATIONS

International Search Report for PCT/JP2014/067424 dated Sep. 9, 2014.

* cited by examiner

TIRE

CROSS REFERENCE TO RELATED APPLICATIONS

This application is a National Stage of International Application No. PCT/JP 2014/067424 filed Jun. 30, 2014, claiming priority based on Japanese Patent Application No. 2013-211745 filed Oct. 9, 2013, the contents of all of which are incorporated herein by reference in their entirety.

TECHNICAL FIELD

The present invention relates to a tire including a plurality of land portions on a tread portion.

BACKGROUND ART

In a tire including a land portion, movement performance on a dry road surface is improved by increasing a ground contact area of the land portion. Furthermore, sliding between the road surface and the land portion is reduced by suppressing local shear deformation of a rubber, which is generated at an end portion of the land portion, thereby improving the movement performance of the tire. Additionally, the actual ground contact area of the land portion is increased by removing water between a tread surface of the land portion and the road surface, thus improving the movement performance of the tire on a wet road surface during straight traveling.

Here, reduction in the ground pressure of the land portion at the end portion facilitates drainage of water on the tread surface into the groove to thereby remove more water. In association with the ground pressure reduction, conventionally, there has been a known pneumatic tire configured to reduce the ground pressure of the land portion at the end portion by forming the tread surface as an arc surface (see Patent Literature 1).

Incidentally, during cornering of the vehicle on the wet road surface, water tends to enter between the tread surface and the road surface and flow from the outer to the inner sides of the vehicle. In the prior-art pneumatic tire as disclosed in Patent Literature 1, water enters into an area around the center of the land portion, which might cause a risk of affecting both the ground performance and the movement performance of the land portion. In addition, during cornering of the vehicle, ground pressure of the land portion on the vehicle outer side rises, which might cause a risk of affecting the noise performance (quietness), and the movement performance of the tire on the dry road surface. Therefore, the prior-art pneumatic tire still has room for improvement from the viewpoint of ensuring high noise performance in addition to the movement performance both on the dry and wet road surfaces.

CITATION LIST

Patent Literature

PTL 1: Japanese Patent Laid-Open No. 2012-116410

SUMMARY OF INVENTION

Technical Problem

The present invention has been made in view of the aforementioned prior-art problems, and an object is to improve noise performance of the tire including the land portion while enhancing its movement performance both on the dry and wet road surfaces.

Solution to Problem

The present invention is a tire including a plurality of land portions formed on a tread portion by a plurality of circumferential grooves extending in a tire circumferential direction, and a mounting direction of the tire with respect to a vehicle is designated. At least one of the land portions includes an outer wall surface positioned on a vehicle outer side, an inner wall surface positioned on a vehicle inner side, a tread surface on an outer side in a tire radial direction, an outer edge of the tread surface in contact with the outer wall surface, and an inner edge of the tread surface in contact with the inner wall surface. The tread surface of the land portion is formed in a convex shape which is smoothly curved between the outer edge and the inner edge and which has a top portion most protruded outward in the tire radial direction, in a cross section of the land portion in a tire width direction. A relationship of $Do < Di$ is satisfied when a distance between the top portion of the tread surface and the outer edge in the tire radial direction is denoted as Do, and a distance between the top portion of the tread surface and the inner edge in the tire radial direction is denoted as Di. The top portion of the tread surface is positioned closer to the inner edge side from a center of the land portion in the tire width direction.

Advantageous Effects of Invention

The present invention makes it possible to improve the noise performance of the tire including land portions while enhancing its movement performance both on dry and wet road surfaces.

DESCRIPTION OF EMBODIMENTS

Figure 1:
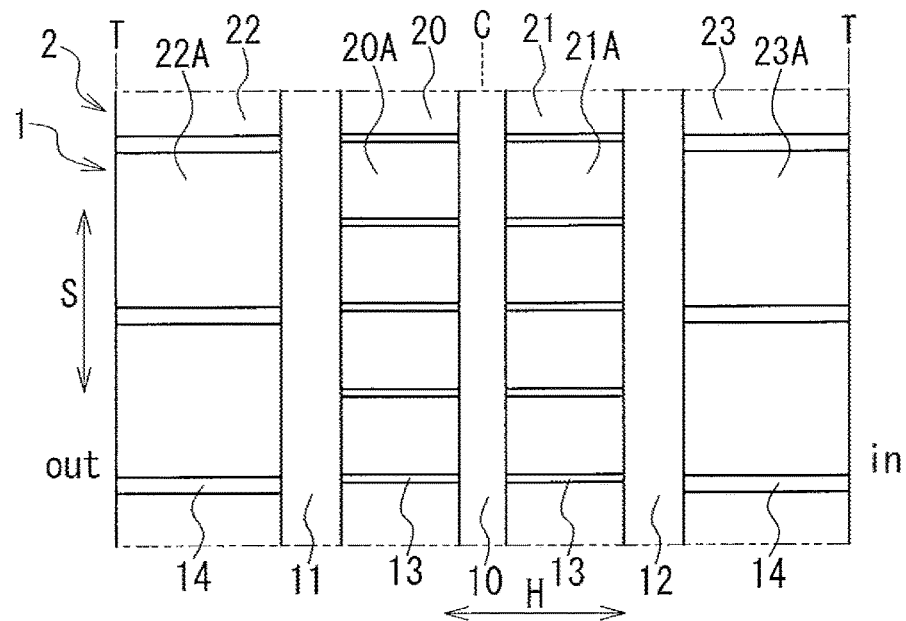
FIG. 1 is a plan view illustrating a tread pattern of a tire according to an embodiment.

An embodiment of a tire according to the present invention will be described referring to the drawings.

The tire according to this embodiment is a pneumatic tire for a vehicle (for, for example, a passenger car), and is formed into a known structure by general tire constituent members. That is, the tire includes a pair of bead portions, a tread portion, and a pair of side wall portions positioned between the bead portions and the tread portion. Furthermore, the tire includes a pair of bead cores, a carcass arranged between the pair of bead cores, a belt arranged on an outer circumferential side of the carcass, and a tread rubber having a predetermined tread pattern.

FIG. 1 is a plan view illustrating a tread pattern of a tire 1 according to the embodiment, and schematically illustrates apart of a tread portion 2 in a tire circumferential direction S.

As illustrated, the tire 1 is a tire designated in specification of its mounting direction with respect to the vehicle (rotational direction during advancing of the vehicle), and the inner side (in-side in FIG. 1) and the outer side (out-side in FIG. 1) of the vehicle are fixed when mounting.

Note that, as to the tire 1, the vehicle inner side denotes a side (vehicle inner side at the time of mounting) being an inner side in a vehicle width direction (vehicle center side) when the tire 1 is mounted on the vehicle. Furthermore, the vehicle outer side denotes a side (vehicle outer side at the time of mounting) being an outer side in the vehicle width direction (vehicle lateral side) when the tire 1 is mounted on the vehicle. In a state where the tire 1 is mounted on the vehicle, the vehicle inner side of the tire 1 is positioned on the inner side in the vehicle width direction, and the vehicle outer side of the tire 1 is positioned on the outer side in the vehicle width direction. The tread pattern is set in accordance with the mounting direction of the tire 1 with respect to the vehicle, and is formed on the tread portion 2.

The tread portion 2 of the tire 1 includes a plurality of circumferential grooves 10 to 12, a plurality of width-direction grooves 13 and 14, and a plurality of land portions 20 to 23. The plurality of circumferential grooves 10 to 12 is main grooves extending in a tire circumferential direction S (circumferential main grooves), and is constituted of the center circumferential groove 10 positioned on a tire equatorial plane C, and the two outer circumferential grooves 11 and 12 positioned on outer sides of the center circumferential groove 10 in a tire width direction H. The tire equatorial plane C represents the center plane of the tire 1 in the tire width direction H, and the outer circumferential grooves 11 and 12 are formed between the center circumferential groove 10 (tire equatorial plane C) and tread ends T, respectively. The tread portion 2 is partitioned by the plurality of circumferential grooves 10 to 12, and thus the plurality of land portions 20 to 23 is formed on the tread portion 2 along the tire circumferential direction S.

The land portions 20 to 23 are ribs (continuous land portions) continuously extending in the tire circumferential direction S, or block rows (intermittent land portions) including a plurality of blocks arranged in the tire circumferential direction S. The land portions 20 to 23 are block rows having a plurality of blocks 20A to 23A, and are constituted of the two center land portions 20 and 21, and the two shoulder land portions 22 and 23. The center land portions 20 and 21 each have a plurality of width-direction grooves 13 and are formed on both sides of the tire equatorial plane C of the tread portion 2. The shoulder land portions 22 and 23 each have a plurality of width-direction grooves 14 and are formed on outer sides (shoulder portion sides) of the center land portions 20 and 21 in the tire width direction H. The width-direction grooves 13 and 14 extend in the tire width direction H, and thus the land portions 20 to 23 are divided in the tire circumferential direction S. The blocks 20A to 23A are partitioned by the circumferential grooves 10 to 12, and the width-direction grooves 13 and 14, and are formed at the land portions 20 to 23.

A tread surface (ground contact surface) of the land portions 20 to 23 is formed in a convex shape in a cross section of the land portions 20 to 23 in the tire width direction H. Here, the entire tread surface of at least the center land portions 20, 21 which are the closest to the tire equatorial plane C among the plurality of land portions 20 to 23 is formed in the convex shape raised outward in the tire radial direction, and thus the tread surface of the land portions 20, 21 has a convex curved surface. Hereinafter, one land portion 20 (center land portion) is taken as an example, and the tread surface of the land portion 20 will be described in detail.

Figure 2:
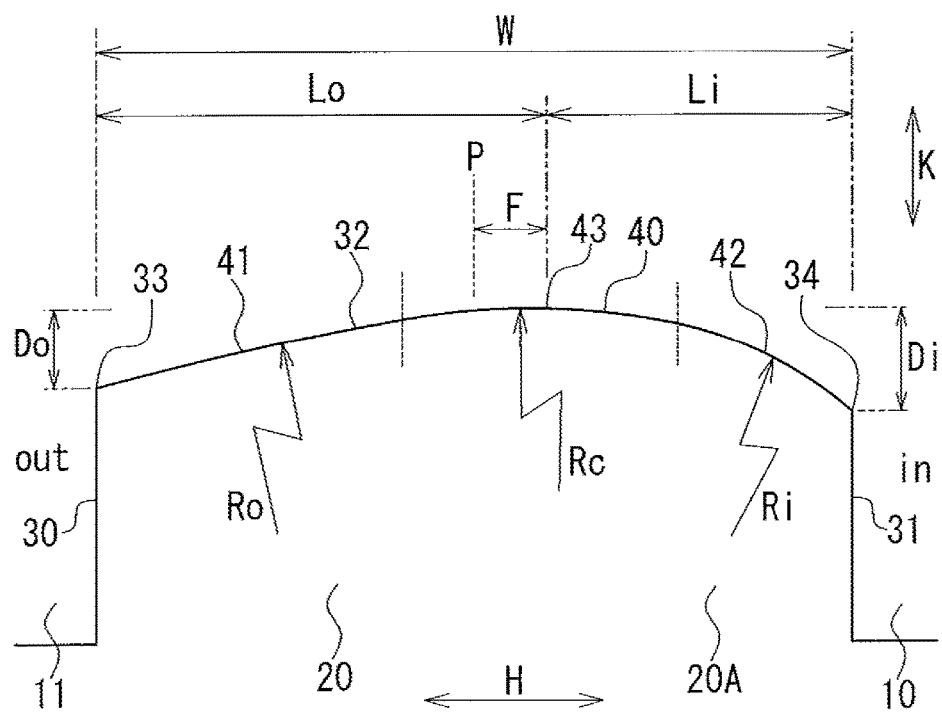
FIG. 2 is a cross-sectional view of the land portion in the tire width direction.

FIG. 2 is a cross-sectional view of the land portion 20 in the tire width direction H.

As illustrated, the land portion 20 includes an outer wall surface 30 positioned on the vehicle outer side (out-side in FIG. 2), an inner wall surface 31 positioned on the vehicle inner side (in-side in FIG. 2), a tread surface 32, and a pair of edges 33 and 34 of the tread surface 32. The wall surfaces (outer wall surface and inner wall surface) 30 and 31 are side wall surfaces of the land portion 20 positioned between the circumferential grooves 10 and 11, and are formed extending from the bottom of the circumferential grooves 10 and 11 to the tread surface 32. The tread surface 32 is formed on the outer side of the land portion 20 in the tire radial direction K, and is in contact with the road surface at the time of rolling of the tire 1. The pair of edges 33 and 34 are corner portions of the land portion 20 positioned between the tread surface 32 and the wall surfaces 30 and 31, respectively, and are constituted of the outer edge 33 and the inner edge 34. The outer edge 33 is a vehicle outer end of the tread surface 32 in contact with the outer wall surface 30, and the inner edge 34 is a vehicle inner end of the tread surface 32 in contact with the inner wall surface 31.

The tread surface 32 of the land portion 20 is formed in a convex shape having a plurality of arc curved portions (arc portions 40 to 42) smoothly connected in a cross section of the land portion 20 in the tire width direction H. That is, the tread surface 32 is smoothly curved on boundaries (indicated by dotted lines in FIG. 2) among the plurality of arc portions 40 to 42, and thus the entire tread surface 32 is formed into a smoothly curved surface (convex curved surface). The convex shape of the tread surface 32 is smoothly curved between the outer edge 33 and the inner edge 34, and has a top portion 43 most protruded outward in the tire radial direction K. The top portion 43 having the convex shape is the top portion 43 of the tread surface 32 and is positioned between the center of the land portion 20 in the tire width direction H (center P of the land portion 20) and the inner edge 34, and is positioned closer to the inner edge 34 side out of the center position of the land portion 20.

In a cross section of the land portion 20 in the tire width direction H, the distance between the top portion 43 of the tread surface 32 and the outer edge 33 in the tire radial direction K is denoted as Do, and the distance between the top portion 43 of the tread surface 32 and the inner edge 34 in the tire radial direction K is denoted as Di. In this case, the distances Do and Di satisfy the relationship of (Do<Di), that is, the distance Do is smaller than the distance Di. Here, the distance Di is not more than 6 times the distance Do, and the distances Do and Di satisfy the relationship of (1<Di/Do≤6).

In a cross section of the land portion 20 in the tire width direction H, the top portion 43 of the tread surface 32 is positioned closer to the inner edge 34 side from the center P of the land portion 20, and is formed between the center P of the land portion 20 and the inner edge 34 and on the position other than the center P of the land portion 20 and the inner edge 34. Specifically, the width of the land portion 20 in the tire width direction H is denoted as W, the distance between the top portion 43 of the tread surface 32 and the outer edge 33 in the tire width direction H is denoted as Lo, and the distance between the top portion 43 of the tread surface 32 and the inner edge 34 in the tire width direction H is denoted as Li. In this case, the width W and the distances Lo and Li satisfy the relationships of (W>Lo>Li>0 and W=Lo+Li). Furthermore, here, the distances Lo and Li also satisfy the relationship of (0.25≤Li/Lo<1).

The convex shape of the tread surface 32 of the land portion 20 forms a convex curve obtained by smoothly connecting the plurality of arc portions 40 to 42 each having a predetermined radius of curvature in a cross section of the land portion 20 in the tire width direction H. The radius of curvature of the tread surface 32 varies between the outer edge 33 and the inner edge 34. The plurality of arc portions 40 to 42 has the top arc portion 40 including the top portion 43 of the tread surface 32, the outer arc portion 41 extending from the outer edge 33 toward the top arc portion 40, and the inner arc portion 42 extending from the inner edge 34 toward the top arc portion 40. The top arc portion 40 is formed on the uppermost region of the tread surface 32 including the top portion 43, and is positioned between the outer arc portion 41 and the inner arc portion 42. The outer arc portion 41 is formed on the outer region (region on the vehicle outer side) of the tread surface 32 including the outer edge 33, and the inner arc portion 42 is formed on the inner region (region on the vehicle inner side) of the tread surface 32 including the inner edge 34. In this case, the tread surface 32 is formed only of the three arc portions 40 to 42.

The radiuses of curvature of the outer arc portion 41, the top arc portion 40, and the inner arc portion 42 are denoted as Ro, Rc and Ri, respectively. In this case, the radiuses of curvature Ro, Rc and Ri satisfy the relationship of (Ro≥Rc>Ri). The radius of curvature Rc becomes equal to or smaller than the radius of curvature Ro, and the radius of curvature Ri becomes smaller than the radius of curvature Rc. Furthermore, the radius of curvature Ri of the inner arc portion 42 is equal to or smaller than 30% of the radius of curvature Rc of the top arc portion 40, and the radiuses of curvature Ri and Rc satisfy the relationship of (Ri/Rc≤0.3).

As described above, in the tire 1 according to the embodiment, the tread surface 32 of the land portion 20 is formed into a smoothly curved convex shape. Accordingly, at the time of grounding of the tread surface 32, the ground pressure of the land portion 20 at the top portion 43 becomes higher than the respective ground pressures at the edges 33 and 34, and the ground pressure of the land portion 20 is gradually lowered from the top portion 43 toward the edges 33 and 34, respectively. Consequently, in the case of a wet road surface, water between the tread surface 32 and the road surface can be efficiently discharged to a periphery of the land portion 20, and thus drainage performance is reliably ensured in the land portion 20. As a result of smooth removal of water between the tread surface 32 and the road surface, the actual ground area of the land portion 20 on the wet road surface is enlarged. Therefore, the drainage performance of the land portion 20 is increased, and thus the movement performance of the tire 1 during straight traveling on the wet road surface can be enhanced. The local deformation of the rubber at the end portion of the tread surface 32 in the tire width direction H is also suppressed, thereby reducing sliding between the road surface and the land portion 20. Additionally, sufficient ground area of the land portion 20 is ensured, and thus the tire 1 exhibits high movement performance on the dry road surface.

The distance Do between the top portion 43 and the outer edge 33 in the tire radial direction K is smaller than the distance Di between the top portion 43 and the inner edge 34 in the tire radial direction K. Consequently, during cornering of the vehicle on the wet road surface, water is unlikely to enter from the outer edge 33 to the tread surface 32, and thus the drainage performance of the land portion 20 is ensured. Furthermore, the ground pressure of the land portion 20 on the outer edge 33 side becomes higher than the ground pressure of the land portion 20 on the inner edge 34 side. Accordingly, in the outer region of the tread surface 32, water is restrained from entering between the tread surface 32 and the road surface, and is also restrained from flowing from the vehicle outer side to the vehicle inner side. As a result, it is possible to enhance the ground performance of the land portion 20 and the movement performance of the tire 1.

Here, assuming that the distance Do between the top portion 43 and the outer edge 33 in the tire radial direction K is made smaller than the distance Di between the top portion 43 and the inner edge 34 in the tire radial direction K, rigidity of the land portion 20 differs between the outer and the inner regions of the tread surface 32, which might cause a risk that rigidity of the land portion 20 in the outer region becomes relatively higher. In contrast, in the tire 1, the top portion 43 of the tread surface 32 is positioned closer to the inner edge 34 side from the center P of the land portion 20, thereby making it possible to improve the rigidity balance of the land portion 20 in the tire width direction H. Furthermore, it is possible to suppress the increase in rigidity of the land portion 20 in the outer region, and to suppress the increase in the ground pressure of the land portion 20 in the outer region. As a result, noise of the tire 1 during traveling is hardly generated, thereby making it possible to enhance the noise performance of the tire 1. It is also possible to enhance the ground performance of the land portion 20 on the dry road surface, and the movement performance of the tire 1.

In this way, it is possible to improve the noise performance of the tire 1 according to the embodiment while enhancing the movement performance both on the dry and wet road surfaces. Furthermore, since a radius of curvature Ro of the outer arc portion 41 is relatively large, local concentration of the ground pressure of the land portion 20 is prevented in the outer region of the tread surface 32, and thus the land portion 20 is mildly grounded on a ground surface. As a result, the noise performance of the tire 1 and the ground performance of the land portion 20 on the dry road surface can be reliably enhanced.

When the radius of curvature Ri of the inner arc portion 42 is not more than 30% of the radius of curvature Rc of the top arc portion 40, the ground pressure of the land portion 20 in the top region of the tread surface 32 is made higher, thereby making it possible to further enhance the drainage performance of the land portion 20. When the distance Di between the top portion 43 and the inner edge 34 in the tire radial direction K is not more than 6 times the distance Do between the top portion 43 and the outer edge 33 in the tire radial direction K, it is possible to obtain the aforementioned effect while suppressing generation of uneven abrasion on the land portion 20.

Note that, preferably, a distance F between the center P and the top portion 43 of the land portion 20 in the tire width direction is not more than 25% of the width W of the land portion 20 in the tire width direction (0<F≤0.25W). Accordingly, the rigidity balance of the land portion 20 in the tire width direction H is maintained, and thus the noise performance of the tire 1 is further enhanced. Furthermore, it is possible to suppress the influence on the braking performance of the tire 1 when each of the distance Di between the top portion 43 and the inner edge 34 in the tire radial direction K, and the distance Do between the top portion 43 and the outer edge 33 in the tire radial direction K is equal to or smaller than 1 mm.

Preferably, the distance Do between the top portion 43 and the outer edge 33 in the tire radial direction K is in the range of 30% to 70% of the distance Di between the top portion 43 and the inner edge 34 in the tire radial direction K. By setting the distance Do between the top portion 43 and the outer edge 33 in the tire radial direction K to be not less than 30% of the distance Di between the top portion 43 and the inner edge 34 in the tire radial direction K, it is possible to suppress the generation of the uneven abrasion in the land portion 20 while keeping the rigidity balance of the land portion 20 in the tire width direction H. Furthermore, by setting the distance Do between the top portion 43 and the outer edge 33 in the tire radial direction K to be not more than 70% of the distance Di between the top portion 43 and the inner edge 34 in the tire radial direction K, it is possible to enhance the movement performance of the tire 1 during cornering of the vehicle on the wet road surface while enhancing the drainage performance of the land portion 20.

As described above, the present invention has been described by taking the pneumatic tire as an example. However, the present invention can also be applied to the tire filled with gas other than air, or the tire of any other type. Furthermore, the sipe having a width of 1.5 mm or less or any type of groove other than the one described above may be formed on the tread portion 2.

At the land portion to which the above-described cross-section is applied (for example, land portion 20), sufficient drainage performance of the land portion can be obtained even without provision of the groove crossing the land portion in the tire width direction H. The land portion may be one having no groove crossing the land portion, or one having the groove open to the circumferential grooves 10 to 12 only at one end. In this case, it is possible to ensure sufficient ground area of the land portion, and to further enhance the operation stability including turning performance, on the wet road surface. However, in such a land portion, even when the sipe crosses in the tire width direction H, the ground area hardly varies. Accordingly, the sipe may be formed on the land portion.

In this way, in order to realize securement of the ground area and enhancement of the operation stability in addition to the drainage performance, it is preferable to form each of the center land portions 20 and 21 in a rib-like shape. The rib-like shape represents that the land portions are continuous in the tire circumferential direction S, and includes the shape defined only by the sipe (for example, the sipe having a width equal to or less than 1.5 mm). During turning of the vehicle, the ground pressure of the center land portion 20 on the vehicle outer side becomes higher than the ground pressure of the center land portion 21 on the vehicle inner side. The convex shape of the center land portion 20 is set in accordance with a relatively high ground pressure by making the distances Do and Di of the center land portion 20 larger than those Do and Di of the center land portion 21, respectively, with the result that effective drainage performance during turning is ensured. In contrast, during the normal traveling of the vehicle (the straight traveling), the ground pressure of the center land portion 21 on the vehicle inner side becomes higher than the ground pressure of the center land portion 20 on the vehicle outer side, due to negative camber and the like. The convex shape of the center land portion 21 is set in accordance with a relatively high ground pressure by making the distances Do and Di of the center land portion 20 smaller than those Do and Di of the center land portion 21, respectively, with the result that the drainage performance during the straight traveling is enhanced. Accordingly, the tire specialized for drainage performance during the straight traveling can be obtained.

The plurality of the arc portions of the tread surface 32 will do as long as it has at least three arc portions 40 to 42. That is, arc portions except three arc portions 40 to 42 may be formed between the top arc portion 40 and the outer arc portion 41, or between the top arc portion 40 and the inner arc portion 42. Small arc portions produced through chamfering (for example, arc portion having a radius of curvature of 1 mm) may be formed outside the outer arc portion 41 and the inner arc portion 42 in the tire width direction H.

Additionally, although the embodiment has been described by taking the cross-sectional shape of the land portion 20 as the example, the effect derived from the tire 1 according to the embodiment can be obtained as long as at least one of the land portions 20 to 23 is formed as described above. However, preferably, the cross sections as described above are applied to all the land portions sandwiched between the outer circumferential grooves 11 and 12 positioned on the outermost sides in the tire width direction H.

(Tire Testing)

In order to check the effects according to the invention, four tires as examples (referred to as embodied products 1 to 4) corresponding to the tire 1 according to the embodiment, one prior-art tire (referred to as a prior-art product), and one tire as a comparative example (referred to as comparative product) were produced, and the resultant products were evaluated with respect to the performance. Values of the first ratio (Li/Lo) and the second radio (Di/Do) of the embodied products, the prior-art product, and the comparative product were changed. The first ratio (Li/Lo) denotes the ratio of the distance Li between the top portion 43 and the inner edge 34 in the tire width direction H, to the distance Lo between the top portion 43 and the outer edge 33 in the tire width direction H. The second ratio (Di/Do) denotes the ratio of the distance Di between the top portion 43 and the inner edge 34 in the tire radial direction K, to the distance Do between the top portion 43 and the outer edge 33 in the tire radial direction K. The embodied products, the prior-art product, and the comparative product are the same as one another in terms of configurations except values of the first ratio (Li/Lo) and the second ratio (Di/Do).

The embodied products, the test for evaluating the braking performance, the turning performance on the wet road surface, and the noise performance were carried out by using the embodied products, the prior-art product, and the comparative product. In the testing, after braking was fully applied to the vehicle traveling at the predetermined speed both on the dry and wet road surfaces of the straight road, the braking distance until the stop of the vehicle was measured. The braking performance was evaluated by making a comparison among the measurement values of the braking distance. Furthermore, the turning acceleration was measured by running the vehicle on the wet road surface, and the turning performance on the wet road surface was evaluated by making a comparison among the measurement values of the turning acceleration. Noise inside the vehicle was measured during traveling of the vehicle, and the noise performance was evaluated by making a comparison among the measurement values of noise. The testing of the embodied products, the prior-art product, and the comparative product were all performed under the same conditions to thereby give the test results. Table 1 shows the first ratio (Li/Lo), the second ratio (Di/Do), and the test results.

TABLE 1

|  | Prior-art product | Embodied product 1 | Embodied product 2 | Embodied product 3 | Embodied product 4 | Comparative product 1 |
| --- | --- | --- | --- | --- | --- | --- |
| Li/Lo | 1 | 0.25 | 0.25 | 0.25 | 0.75 | 1.25 |
| Di/Do | 1 | 3 | 6 | 7 | 6 | 6 |
| Braking performance | Reference | ◎ | ◎ | ○ | ○ | ○ |
| Turning performance | Reference | ◎ | ◎ | ○ | ○ | ○ |
| Noise performance | Reference | ◎ | ◎ | ○ | ○ | △ |

Both values of the first ratio (Li/Lo) and the second ratio (Di/Do) of the prior-art product are set to 1. That is, in the case of the prior-art product, the top portion 43 is positioned at the center P of the land portion, and thus each of two distances Do and Di is the same. In contrast, in the case of the comparative product, the first ratio (Li/Lo) has the value of 1.25 so that the top portion 43 is positioned closer to the outer edge 33 side from the center P of the land portion. The test results were relatively evaluated, with those of the prior-art product as a reference. The performance becomes higher in order from marks of triangle, circle, and double circle.

In all the test results, each performance of the embodied products 1 to 4 became higher than that of the prior-art product. Accordingly, in each of the embodied products 1 to 4, it was found that the braking performance both on the dry and wet road surfaces and the turning performance on the wet road surface were improved, and thus the movement performance was enhanced. Furthermore, in each of the embodied products 1 to 4, it was found that noise was reduced, and thus the noise performance was enhanced. Additionally, each performance of the embodied products 1 and 2 becomes higher than that of the embodied product 3, and it was found that the respective performances was further enhanced by setting the second ratio (Di/Do) to be equal or less than 6. Namely, the respective performances were more reliably enhanced when the distance Di between the top portion 43 and the inner edge 34 in the tire radial direction K is equal to or smaller than 6 times the distance Do between the top portion 43 and the outer edge 33 in the tire radial direction K.

REFERENCE SIGNS LIST

1 tire
2 tread portion
10 center circumferential groove
11 outer circumferential groove
12 outer circumferential groove
20 center land portion
21 center land portion
22 shoulder land portion
23 shoulder land portion
30 outer wall surface
31 inner wall surface
32 tread surface
33 outer edge
34 inner edge
40 top arc portion
41 outer arc portion
42 inner arc portion
43 top portion

The invention claimed is:

1. A tire comprising a plurality of land portions formed on a tread portion thereof by a plurality of circumferential grooves extending in a tire circumferential direction, a mounting direction of the tire with respect to a vehicle being designated, wherein:

a land portion of the plurality of land portions which is closest to a tire equatorial plane includes an outer wall surface configured to be positioned on a vehicle outer side, an inner wall surface configured to be positioned on a vehicle inner side, and a tread surface on an outer side of the tire in a tire radial direction, an outer edge of the tread surface being in contact with the outer wall surface, and an inner edge of the tread surface being in contact with the inner wall surface; wherein the inner wall surface is closer to the tire equatorial plane than the outer wall surface of the land portion which is closest to the tire equatorial plane;

the tread surface of the land portion which is closest to the tire equatorial plane is formed in a convex shape which is smoothly curved between the outer edge and the inner edge and which has a top portion most protruded outward in the tire radial direction, in a cross section of the land portion in a tire width direction;

a relationship of Do<Di is satisfied when a distance between the top portion of the tread surface of the land portion which is closest to the tire equatorial plane and the outer edge in the tire radial direction is denoted as Do, and a distance between the top portion of the tread surface of the land portion which is closest to the tire equatorial plane and the inner edge in the tire radial direction is denoted as Di;

the top portion of the tread surface of the land portion which is closest to the tire equatorial plane is positioned closer to the inner edge than a center of the land portion which is closest to the tire equatorial plane in the tire width direction;

the convex shape of the tread surface of the land portion which is closest to the tire equatorial plane exhibits a convex curve formed by smoothly connecting a plurality of arc portions;

the plurality of arc portions has at least a top arc portion including the top portion of the tread surface, an outer arc portion extending from the outer edge toward the top arc portion, and an inner arc portion extending from the inner edge toward the top arc portion;

a relationship of Ro≥Rc>Ri is satisfied when a radius of curvature of the outer arc portion is denoted as Ro, a radius of curvature of the top arc portion is denoted as Rc, and a radius of curvature of the inner arc portion is denoted as Ri;

the radius of curvature Ri of the inner arc portion is not more than 30% of the radius of curvature Rc of the top arc portion; and each of the distance Di between the top portion and the inner edge in the tire radial direction, and the distance Do between the top portion and the outer edge in the tire radial direction is equal to or smaller than 1 mm.

2. The tire according to claim 1, wherein
the distance Di between the top portion of the tread surface and the inner edge in the tire radial direction is not more than 6 times the distance Do between the top portion of the tread surface and the outer edge in the tire radial direction.

3. The tire according to claim 1, wherein
a distance between the center of the land portion which is closest to the tire equatorial plane in the tire width direction and the top portion of the tread surface of the land portion which is closest to the tire equatorial plane in the tire width direction is not more than 25% of a width of the land portion of the land portion which is closest to the tire equatorial plane in the tire width direction.

* * * * *